United States Patent
Natsuno

(10) Patent No.: US 8,108,312 B2
(45) Date of Patent: Jan. 31, 2012

(54) CONTENT PROVIDING METHOD, CONTENT PROVIDING FACILITY, AND USER EQUIPMENT

(75) Inventor: Takeshi Natsuno, Tokyo (JP)

(73) Assignee: NTT DoCoMo, Inc,, Tokyo (JP)

( * ) Notice: Subject to any disclaimer, the term of this patent is extended or adjusted under 35 U.S.C. 154(b) by 1758 days.

(21) Appl. No.: 10/148,722

(22) PCT Filed: Oct. 3, 2001

(86) PCT No.: PCT/JP01/08689
§ 371 (c)(1),
(2), (4) Date: May 28, 2002

(87) PCT Pub. No.: WO02/29576
PCT Pub. Date: Apr. 11, 2002

(65) Prior Publication Data
US 2002/0180782 A1    Dec. 5, 2002

(30) Foreign Application Priority Data

Oct. 3, 2000    (JP) ................................. 2000-304086

(51) Int. Cl.
*G06F 21/00*    (2006.01)

(52) U.S. Cl. ................ 705/59; 705/51; 705/52; 705/53; 705/54; 705/55; 705/56; 705/57; 705/58; 380/255; 380/201

(58) Field of Classification Search .............. 705/51–59; 380/255
See application file for complete search history.

(56) References Cited

U.S. PATENT DOCUMENTS

| | | | |
|---|---|---|---|
| 5,659,350 A * | 8/1997 | Hendricks et al. ............ 725/116 |
| 5,892,900 A * | 4/1999 | Ginter et al. ................... 726/26 |
| 5,943,422 A | 8/1999 | Van Wie et al. .................... 380/9 |
| 6,226,618 B1 * | 5/2001 | Downs et al. ...................... 705/1 |

(Continued)

FOREIGN PATENT DOCUMENTS

JP    10-161937    6/1998

(Continued)

OTHER PUBLICATIONS

Ian Peter's The history of email,(http://www.nethistory.info/History%20of%20the%20Internet/email.html).*

(Continued)

*Primary Examiner* — Calvin Loyd Hewitt, II
*Assistant Examiner* — Cristina Owen Sherr
(74) *Attorney, Agent, or Firm* — Brinks Hofer Gilson & Lione

(57) ABSTRACT

A duplication/delivery center DDS records contents C11 and C12 on a recording medium M in accordance with requests from content providing apparatuses CP11 and CP12, duplicates the recording medium M, and delivers the recording medium M to users. When doing so, parts of the contents are encrypted. The content providing apparatuses CP11 and CP12 request a content control apparatus CC1 to control the contents on the recording media M. At the side of contents users, when a user sets a recording medium M in a video game console GM and tries to use a content that has been encrypted, the video game console GM requests, via a mobile packet communication network MPN, the content control apparatus CC1 to transmit a decryption key. The content control apparatus CC1 decides whether or not to transmit the decryption key based on the content of the request received from the content providing apparatus.

8 Claims, 18 Drawing Sheets

U.S. PATENT DOCUMENTS 6,665,303 B1 12/2003 Saito et al.

FOREIGN PATENT DOCUMENTS

| | | |
|---|---|---|
| JP | 10-207779 | 8/1998 |
| JP | H11-024916 A | 1/1999 |
| JP | 11-98441 | 4/1999 |
| JP | H11-194987 A | 7/1999 |
| JP | 11-219329 | 8/1999 |
| JP | H11-243536 | 9/1999 |
| JP | 11-272762 | 10/1999 |
| JP | 2000-90148 | 3/2000 |
| JP | 2000-187629 | 7/2000 |
| JP | 2000-209169 | 7/2000 |
| JP | 2000-215602 | 8/2000 |
| JP | 2000-250873 | 9/2000 |
| KR | 2000-0006796 | 2/2000 |
| KR | 2000-0054658 | 9/2000 |
| WO | WO97/43761 | 11/1997 |
| WO | WO 00/03316 A1 | 1/2000 |
| WO | WO00/08909 | 2/2000 |
| WO | WO00/39733 | 7/2000 |

OTHER PUBLICATIONS

Japanese Office Action mailed Apr. 25, 2006.
Canadian Office Action dated Jan. 2, 2007.
Office Action from the Canadian Patent Office in the corresponding Canadian patent application, dated Nov. 26, 2007, 8 pgs.).
Office Action dated May 26, 2009, issued in Japanese Patent Application No. 2006-175772, with English translation (6 pages).
Office Action dated Oct. 20, 2009, issued in Japanese Patent Application No. 2006-175772, with English translation (6 pages).
European Office Action dated Mar. 11, 2010, issued in corresponding European Patent Application No. 01974660.1 (4 pgs.).
Norwegian Office Action dated Oct. 12, 2010, issued in corresponding Norwegian Patent Application No. 20022622 w/translation of Office Action (7 pgs.).

* cited by examiner

| CONTENT ID | POST-SWITCHING STATE | SWITCH TIME | KEY | NOTIFICATION METHOD |
|---|---|---|---|---|
| 1_3 | USAGE PERMITTED | 2000/11/1/0:00 | ○○○○ | PULL |
| 1_4 | USAGE PERMITTED | 2000/12/1/0:00 | ×××× | PULL |

T1

| CONTENT ID | POST-SWITCHING STATE | SWITCH TIME | KEY | NOTIFICATION METHOD |
|---|---|---|---|---|
| 2_2 | USAGE PROHIBITED | 2001/1/7/17:00 | △△△△ | PUSH |
| 2_2 | USAGE PERMITTED | 2001/1/1/0:00 | △△△△ | PULL |

T2

| CONTENT ID | POST-SWITCHING STATE | SWITCH TIME | NOTIFICATION METHOD |
|---|---|---|---|
| 1_3 | USAGE PERMITTED | 2000/11/1/0:00 | PULL |
| 1_4 | USAGE PERMITTED | 2000/12/1/0:00 | PULL |
| 2_2 | USAGE PERMITTED | 2001/1/1/0:00 | PULL |
| 2_2 | USAGE PROHIBITED | 2001/1/7/17:00 | PUSH |

T3

| CONTENT ID | PRESENT STATE | KEY |
|---|---|---|
| 1_3 | USAGE PROHIBITED | ○○○○ |
| 1_4 | USAGE PROHIBITED | ×××× |
| 2_2 | USAGE PROHIBITED | △△△△ |

T4

| CONTENT ID | KEY NECESSITY | KEY |
|---|---|---|
| 1_1 | UNNECESSARY | — |
| 1_2 | NECESSARY | □□□□ |
| 1_3 | NECESSARY | |
| 1_4 | NECESSARY | |
| 2_1 | UNNECESSARY | — |
| 2_2 | NECESSARY | |

FIG. 13
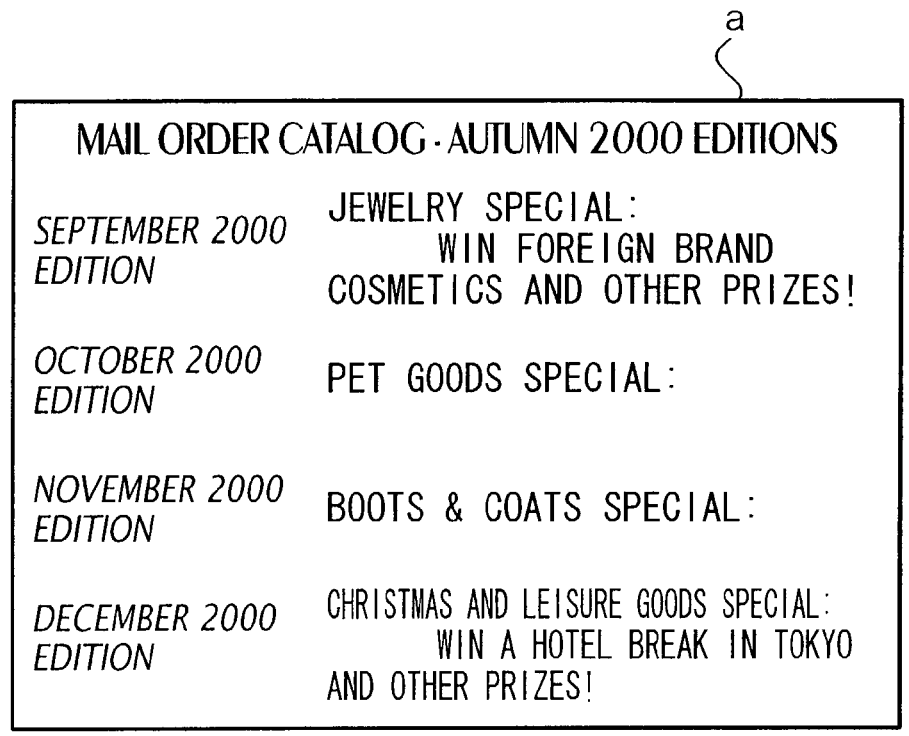

FIG. 14 c

PRIZE QUIZ

ALL CORRECT ANSWERS ARE PLACED IN A PRIZE DRAW. THE QUESTION WILL BE ANNOUNCED AT 0:00 A.M. ON JANUARY $1^{ST}$. PLEASE COME TO THE PAGE AGAIN DURING THE ENTRY PERIOD.

PRIZES

FIRST PRIZE (3 WINNERS) TRIP TO WEST COAST USA

SECOND PRIZE (20 WINNERS) BOOK TOKENS WORTH 3,000 YEN d

PRIZE QUIZ

QUESTION
    IN THE IMAGE BELOW, ONE COLOR HAS BEEN REPLACED WITH ANOTHER COLOR. PLEASE SELECT THE CORRECT PAIR OF COLORS FROM THE SELECTIONS GIVEN BELOW, FILL IN YOUR ANSWER, AND PRESS THE "ENTER QUIZ" BUTTON.

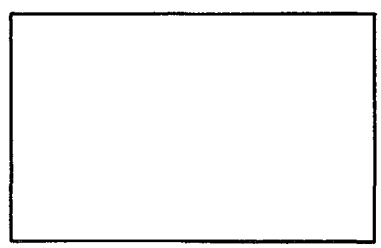

1. .............................
2. .............................
3. .............................

ANSWER  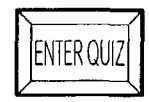  [ENTER QUIZ]

FIG. 16

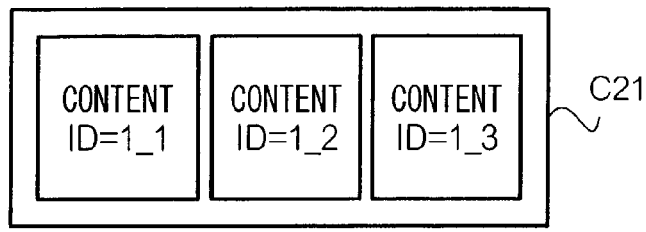

FIG. 17

| CONTENT ID | POST-SWITCHING STATE | SWITCH TIME | KEY | NOTIFICATION METHOD | AGE |
|---|---|---|---|---|---|
| 1_2 | USAGE PERMITTED | 2000/11/1/0:00 | ○○○○ | PULL | 18 AND OVER |
| 1_3 | USAGE PERMITTED | 2000/11/1/0:00 | ×××× | PULL | — |

| CONTENT ID | POST-SWITCHING STATE | SWITCH TIME | NOTIFICATION METHOD |
|---|---|---|---|
| 1_2 | USAGE PERMITTED | 2000/11/1/0:00 | PULL |
| 1_3 | USAGE PERMITTED | 2000/11/1/0:00 | PULL |

T6

| CONTENT ID | PRESENT STATE | KEY | AGE |
|---|---|---|---|
| 1_2 | USAGE PROHIBITED | ○○○○ | 18 AND OVER |
| 1_3 | USAGE PROHIBITED | ×××× | — |

T7

| TELEPHONE NUMBER | DATE OF BIRTH | | |
|---|---|---|---|
| 090... | 1984/4/5 | | |
| 090... | 1967/9/5 | | |

T8

| CONTENT ID | KEY NECESSITY | KEY |
|---|---|---|
| 1_1 | UNNECESSARY | — |
| 1_2 | NECESSARY | |
| 1_3 | NECESSARY | |

FIG. 25
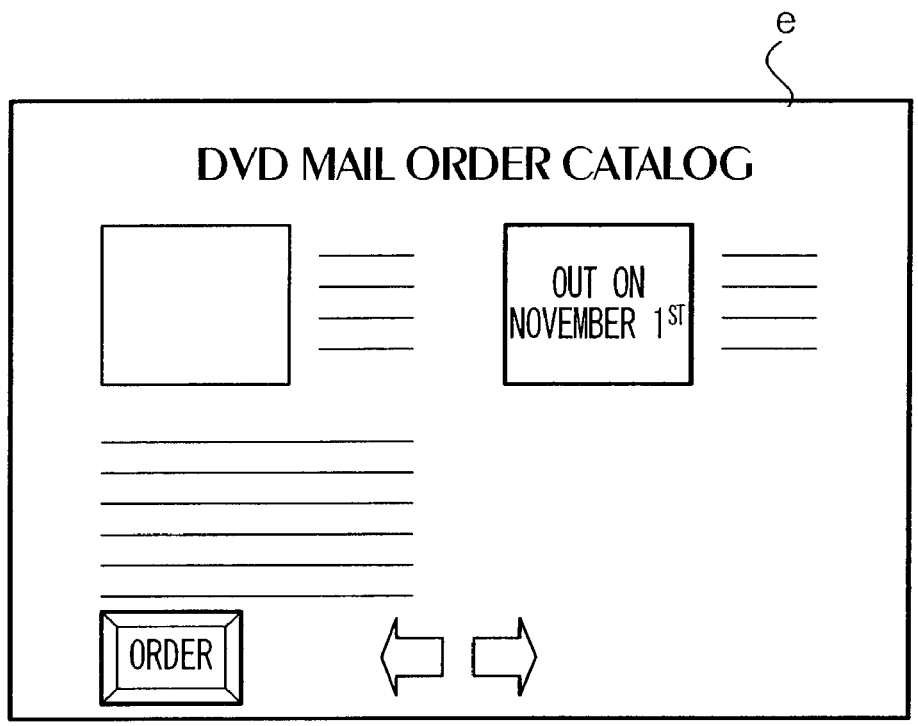
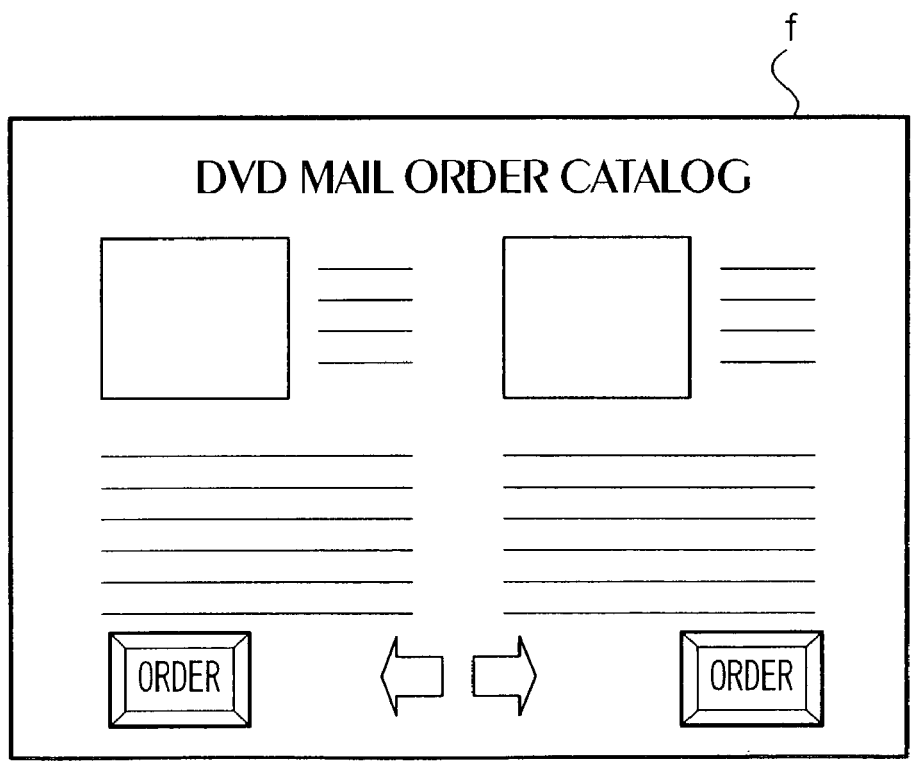

| CONTENT ID | POST-SWITCHING STATE | SWITCH TIME | KEY |
|---|---|---|---|
| 1_2 | USAGE PERMITTED | 2000/11/1/0:00 | ○○○○ |

T9

| CONTENT ID | KEY NECESSITY | KEY |
|---|---|---|
| 1_1 | UNNECESSARY | — |
| 1_2 | NECESSARY | |

CONTENT PROVIDING METHOD, CONTENT PROVIDING FACILITY, AND USER EQUIPMENT

TECHNICAL FIELD

The present invention relates to a content providing method for providing contents to a user of user equipment by supplying contents to user equipment in a remote location from provider facility which provides contents, and also relates to content providing facility and user equipment for realizing the present method.

BACKGROUND ART

Conventional mail order retailing usually uses a procedure where a printed catalog is produced and delivered to provide members with product information, with the users then ordering their desired products by telephone. For a large mail order retailer, there is a large amount of product information, so that it is common for such printed catalogs to be as thick and as heavy as a normal magazine. Further, because the product information is usually updated little by little, it is necessary for a new printed catalog to be produced and delivered at certain intervals. However, the production and delivery of such catalogs incur a similar cost to the publishing of a normal magazine.

For this reason, some mail order retailers have tried to have the production and delivery costs of printed catalogs borne by consumers by making users pay for the printed catalogs. However, making users pay for printed catalogs has a high probability of discouraging potential customers, so that there is the risk of limiting the market for the products.

There is also the problem that while short, it takes some time between the production of the catalogs and their delivery. In today's consumer society, companies need to quickly provide consumers with products (and/or services) that appropriately reflect the tastes of consumers, so that the time taken from the release of products to the delivery of catalogs to consumers prevents companies from properly satisfying this need.

It should be obvious that such time-related problems could be solved if it were possible to deliver a content, such as a catalog, on demand using broadband communication where a large amount of audio and image data can be transmitted at high speed, but the establishment of such communications infrastructure is expected to take a long time. Even if such infrastructure were to be established, it would still take longer for the delivery costs to fall.

The present invention was conceived in view of the situation described above, and has an object of providing a content providing method that can provide content quickly and at low cost, as well as content providing facility and user equipment for realizing the present method

DISCLOSURE OF THE INVENTION

In order to solve the stated problem, the present invention provides a content providing method, comprising: a step of distributing from a content providing apparatus a recording medium, on which a content that can be reproduced by performing a specified process using specified usage-enabling information is recorded, to a user; a step of determining in a content control apparatus a schedule for distributing the usage-enabling information to reception and reproduction equipment in accordance with an instruction from the content providing apparatus; a step of push-delivering, from the content control apparatus, the usage-enabling information to the user equipment in accordance with the schedule; and a step of reproducing in the user equipment the content from the recording medium using the usage-enabling information received via the push delivery.

At least part of the content may be encrypted, and the usage-enabling information may be key information that is required to restore the content to a pre-encryption state.

Also, the content may include a program for providing a user interface used by the user for using the content on the user equipment.

In a preferred mode, the usage-enabling information is preferably delivered via a communication network. In this case, the usage-enabling information may be delivered in the push delivery step in the form of electronic mail. Also, the content may include a control program for having the user equipment communicate via the communication network.

The communication network is preferably a packet communication network.

Also, the communication network may be a mobile communication network. In this case, the push delivery step for the usage-enabling information may include: transmitting from the content providing apparatus attribute information specifying the user equipment with desired attributes to the content control apparatus; transmitting a request from the content control apparatus to the mobile communication network, on the basis of the transmitted attribute information, the request asking the delivery of the usage-enabling information only to the specified user equipment; and transferring from mobile communication network the usage-enabling information to the user equipment in question.

The present invention further provides a content providing method, comprising: a step of distributing from a content providing apparatus a recording medium, on which a content that can be reproduced by performing a specified process using specified usage-enabling information is recorded, to a user; a step of transmitting from the content providing apparatus to the content control apparatus, an instruction including information indicating a switch between whether or not a distribution of the usage-enabling information is permitted and information indicating a time for performing the switch; a step of switching in the content control apparatus, at the time specified by and in accordance with the instruction received from the content providing apparatus, between whether or not the distribution of the usage-enabling information is permitted; and a step of delivering the usage-enabling information when the delivery of the usage-enabling information is permitted and there has been a delivery request from the user and rejecting the delivery of the usage-enabling information when delivery of the usage-enabling information is not permitted and there has been a delivery request from the user.

At least part of the content may be encrypted, and the usage-enabling information may be key information that is required to restore the content to a pre-encryption state.

It is preferable that during the switching step, when the delivery of the usage-enabling information is not permitted, the content control apparatus multicasts an instruction that reproduction of the content is prohibited, and on receiving the instruction, a user apparatus deletes the usage-enabling information of the instructed content stored in a memory of the user apparatus. In this case, the instruction may be multicast via a communication network.

The present invention also provides content providing facility, comprising: distributing means for distributing a recording medium, on which a content that can be reproduced by performing a specified process using specified usage-enabling information is recorded, to a user; schedule determining means for determining a schedule for distributing the usage-enabling information to user equipment; and delivery means for performing a push delivery of the usage-enabling information to the user equipment in accordance with the schedule determined by the schedule determining means.

Preferably, an apparatus in which the distributing means is provided and an apparatus in which the delivery means is provided are located apart from each other.

The present invention also provides content providing facility, comprising: distributing means for distributing a recording medium, on which a content that can be reproduced by performing a specified process using specified usage-enabling information is recorded, to a user; instructing means for giving an instruction that specifies a switch between whether or not a delivery of the usage-enabling information is permitted and specifies a time for performing the switch; switching means for performing, at the time specified by the instruction, the switch between whether or not the delivery of the usage-enabling information is permitted in accordance with the instruction; and means for delivering the usage-enabling information when the delivery of the usage-enabling information is permitted and there has been a delivery request from the user and rejecting the delivery of the usage-enabling information when the delivery of the usage-enabling information is not permitted and there has been a delivery request from the user.

The present invention also provides user equipment, comprising: reading means for reading contents that can be reproduced by performing a specified process using specified usage-enabling information, the contents having been recorded on a recording medium distributed by content providing facility; storing means for storing initial state information for a content in a memory after reproducing the content, out of the contents that have been read by the reading means, that has not been subjected to the specified process; receiving means for receiving the usage-enabling information from the content providing facility; updating means for updating the state information stored in the memory by the storing means in accordance with the information received by the receiving means; and reproducing means for reproducing a content that has been subjected to the specified processing in accordance with the state information.

For such user equipment, it is preferable that the receiving means receives the information via a mobile communication network, and the user equipment is configured by connecting a data terminal that is capable of using the content and a mobile communication terminal that is served by the mobile communication network.

According to the present invention, large contents that have been partially encrypted are recorded onto a recording medium and distributed to users, so that compared to the case where a printed catalog is produced and delivered, it is possible to provide contents at a low cost and at high speed. Key information (usage-enabling information) that is required for the reproduction of an encrypted content is push delivered according to a predetermined schedule, so that administrators at a content provider are relieved of the burden of having to manage the distribution timing. In addition, by setting the schedule, it is possible to switch between whether the delivery of key information is permitted or prohibited, so that user accesses to contents can be controlled, which is effective when, for example, providing a content that is only available for a limited period, such as a prize draw with a limited entry period. In the same way, by specifying attribute information of terminals that are permitted to receive the key information, it is also possible to control the delivery of content for which access by certain users, such as underage users, should be prohibited.

BRIEF DESCRIPTION OF THE DRAWINGS

FIG. 13 is a representation of a user interface that is provided by the content providing system 1 according to the first embodiment.

FIG. 14 is a representation of a user interface that is provided by the content providing system 1 according to the first embodiment.

FIG. 16 is a conceptual diagram showing one example of the configuration of contents that are provided by the content providing system 2 according to the second embodiment.

FIG. 17 is a conceptual diagram showing one example of data configuration of a control request table T5 that is provided to a content control apparatus from a content providing apparatus with respect to the control of contents according to the second embodiment.

FIG. 18 shows examples of data configurations of a control schedule T6 and a control table T7 that are obeyed by the content control apparatus with respect to the control of contents according to the second embodiment, as well as one example of data configuration of an essential part of a subscriber information table T8 in a gateway server that forms part of the same content providing system 2.

FIG. 25 is a representation of a user interface provided by the content providing system 2 according to the second embodiment.

BEST MODE FOR CARRYING OUT THE INVENTION

Figure 1:
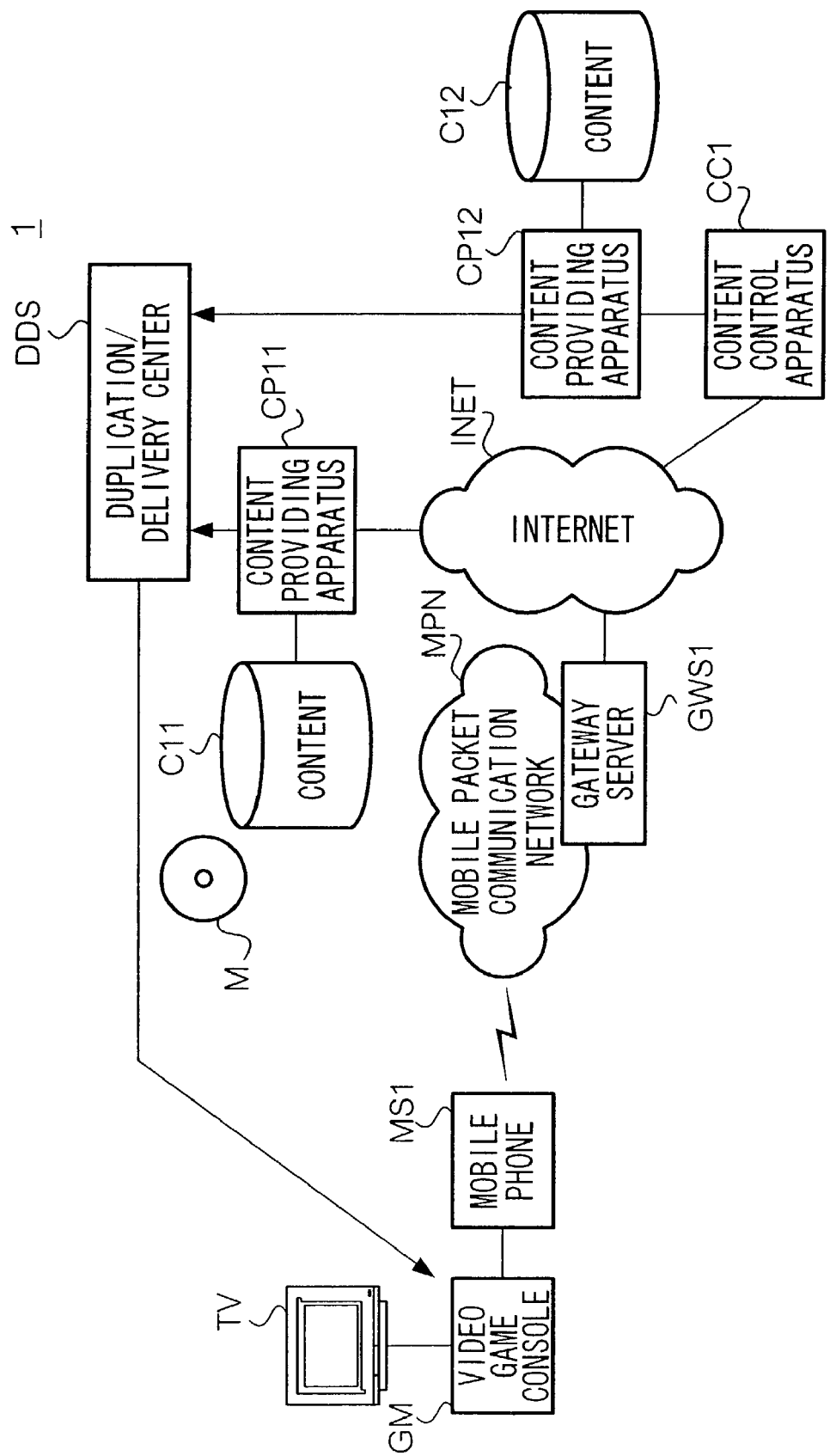
FIG. 1 shows an overall configuration of a content providing system 1 according to a first embodiment of the present invention.

The following describes embodiments of the present invention with reference to the attached drawings. It should be noted that parts that are common to each drawing have been given the same reference numerals.

A. First Embodiment

A-1 Configuration

FIG. 1 shows an overall configuration of a content providing system 1 according to a first embodiment of the present invention. As shown in the drawing, the content providing system 1 includes a content providing apparatus CP11 that provides a content C11; a content providing apparatus CP12 that provides a content C12; a duplication/delivery center DDS for duplicating a recording medium M (such as a CD-ROM (Compact Disk Read-Only Memory); a DVD-ROM (Digital Versatile Disk Read-Only Memory), or a magneto-optical disk) that stores therein the contents provided by the content providing apparatuses CP11 and CP12 and delivering the contents to users; the Internet INET to which the content providing apparatus CP11 is connected; a content control apparatus CC1 that is connected to the Internet INET and the content providing apparatus CP12 and controls the usage of distributed content via the Internet INET; a gateway server GWS1 that is connected to the Internet INET; a mobile packet communication network MPN that is connected to the Internet INET via the gateway server GWS1; a mobile phone MS1 that is served by the mobile packet communication network MPN; a video game console GM that is connected to the mobile phone MS1 and can read contents that are stored on the recording medium M; and a television receiver TV that is connected to the video game console GM.

It should be noted that the mobile phone MS1, the mobile packet communication network MPN, and the gateway server GWS1 are all constituting elements of a conventional communication system where the WWW (World Wide Web) can be used via the mobile phone MS1, so that out of the functions of these devices, the following explanation only describes the functions that are directly related to the present invention. The Internet INET is also well known, so that an explanation of such has been omitted.

Figures 2, 3:
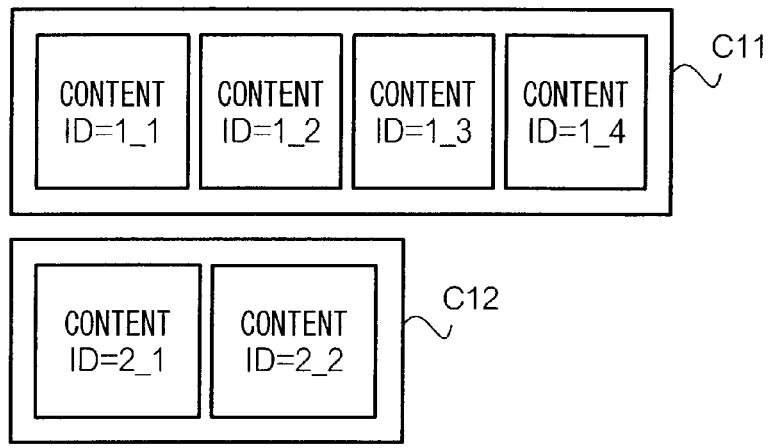
FIG. 2 is a conceptual diagram showing one example of the configuration of contents that are provided by the content providing system 1 according to the first embodiment.
FIG. 3 is a conceptual diagram showing examples of the data configurations of control request tables T1 and T2 that are provided to a content control apparatus from a content providing apparatus with respect to the control of contents according to the first embodiment.

The following describes the functions of the various components, though to simplify the explanation, it is assumed that the contents C11 and C12 have the configurations shown in FIG. 2 with both contents C11 and C12 being provided after being recorded on a single recording medium M. The contents C11 and C12 are assumed to include at least a communication program for causing the video game console GM communicate with the content control apparatus CC1 via the mobile phone MS1 and a U/I (user interface) program for using the contents. By using this U/I program, the contents C11 or C12 or another arbitrary content can be used.

The content providing apparatuses CP11 and CP12 are apparatuses that are managed by different content providers, and each apparatus is composed of an ordinary computer system. The content providing apparatuses C11 and CP12 respectively operate according to the instructions of an administrator so that the duplication/delivery center DDS is requested to deliver of a content desired by the administrator. Any method may be used to transfer contents from the content providing apparatuses CP11 and CP12 to the duplication/delivery center DDS. As examples, the content providing apparatuses C11 and CP12 may produce master CD-ROMs that are passed over to the duplication/delivery center DDS, or the content providing apparatuses C11 and CP12 may transmit the desired contents to the duplication/delivery center DDS via a communication network such as a dedicated line or a public network.

Out of the contents shown in FIG. 2, the contents with the content IDs (a content ID being information for exclusively identifying a content) 1_3, 1_4, and 2_2 are information whose usage is permitted or prohibited according to a schedule that is determined in advance, and are encrypted by the content providing apparatuses CP11 or CP12 using unique keys. Initial state information showing an initial state (whether a key is necessary, etc.) of each content and the communication program mentioned earlier are included in unencrypted contents (in the present embodiment, the first contents), and are passed over to the duplication/delivery center DDS together with the encrypted contents.

The content providing apparatuses C11 and CP12 each request the content control apparatus CC1 to control the usage of the contents passed over to the duplication/delivery center DDS. It should be noted that, in the present invention, the content control apparatus CC1 and the content providing apparatus C11 are located far apart from each other, so that the content providing apparatus CP11 transmits requests to the content control apparatus CC1 via the Internet INET. On the other hand, the content control apparatus CC1 and the content providing apparatus CP12 are located close to each other, so that the content providing apparatus CP12 directly makes requests to the content control apparatus CC1. Of course, even when the devices are close to one another, it is still possible for this requesting to be performed via a communication network.

The following describes, with reference to FIG. 3, the data configuration of a control request table T1 that is supplied from the content providing apparatus CP11 to the content control apparatus CC1 when a request is made, and that of a control request table T2 that is supplied from the content providing apparatus CP12 to the content control apparatus CC1 when a request is made. As shown in the drawing, each record in the control request tables T1 and T2 can include, for example, a content ID, a switch time at which the state of the corresponding content switches between usage permitted and usage prohibited, a post-switching state that shows whether usage is permitted or prohibited for the content after switching, a corresponding content key, and a notification method to be used when notifying the user as to whether usage of the content is permitted. This notification is performed by either a push-type delivery method where the content provider automatically provides the user with information or a pull-type delivery method where information is delivered in response to a user request (these methods are respectively referred to hereafter as "push" and "pull"). In the present embodiment, to avoid having unnecessary information supplied to the content control apparatus CC1, the content providing apparatuses C11 and CP12 do not include records for contents for which control is not required in the control request tables T1 and T2 that the content providing apparatuses CP11 and CP12 provide to the content control apparatus CC1.

Figures 4, 5:
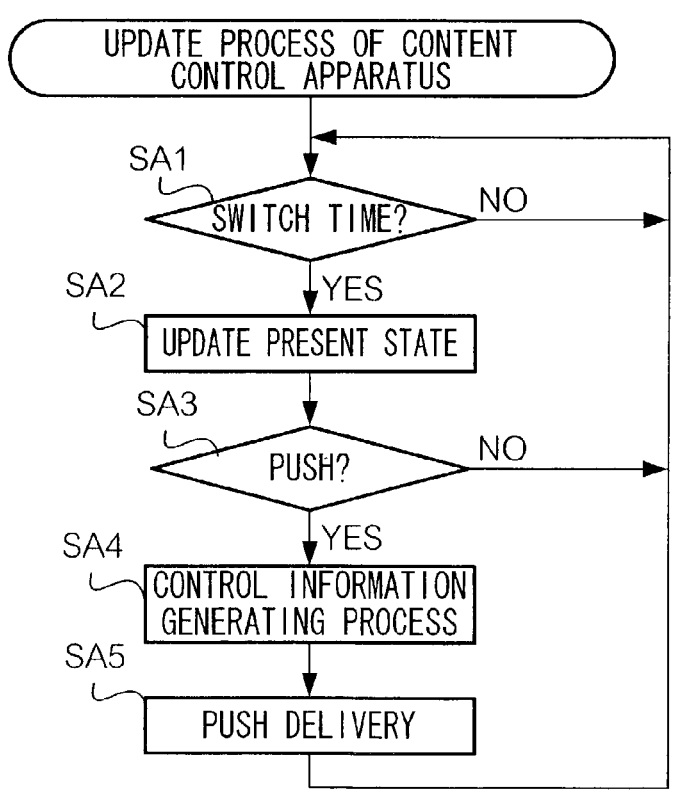
FIG. 4 is a conceptual diagram showing one example of the data configuration of a control schedule T3 and a control table T4 that are obeyed by the content control apparatus with respect to the control of contents according to the first embodiment.
FIG. 5 is a flowchart showing a flow of an update process in the content control apparatus according to the first embodiment.

The content control apparatus CC1 is composed of an ordinary computer system and operates based on the control request tables T1 and T2 that are received from the content providing apparatuses CP11 and CP12. In more detail, on receiving the control request tables T1 and T2, the content control apparatus CC1 generates a control schedule T3 and a control table T4, examples of which are shown in FIG. 4, based on the received control request tables T1 and T2, and controls the usage of the distributed contents in accordance with the generated control schedule T3 and control table T4. The content control apparatus CC1 also has proxy functions for performing mail order retailing or conducting a prize draw for a content providing apparatus C11 or CP12, with the content control apparatus CC1 using these functions when requested by the content providing apparatus CP11 or CP12. Such proxy functions are already well known.

As shown in FIG. 4, each record in the control schedule T3 includes a content ID, a switch time, a post-switching state, and a notification method. The records in the control schedule T3 are sorted in order of the switch times, with this order being maintained whenever a new record is added. By doing so, the process (described later) that updates the "present state" of each content in the control table T4 as time passes becomes easier.

In addition to the present states mentioned above, each record in the control table T4 includes, for each content, a content ID, a present state showing a present usage state for the content, and a key. The "present states" are not included in the control request tables T1 and T2, examples of which are shown in FIG. 3, so that on receiving the control request tables T1 and T2, the content control apparatus CC1 sets the present states of the contents subjected to control to a "usage prohibited" state in the present embodiment. As an alternative, the present states may be included in the control request tables T1 and T2, in which case the content control apparatus CC1 can use the present states as provided.

On receiving new control request tables T1 and T2 when currently in possession of a control schedule T3 and a control table T4, the content control apparatus CC1 adds each of the records in the received control request tables T1 and T2 to the control schedule T3 and the control table T4.

The content control apparatus CC1 also has a function for automatically performing an update process for the present states in the control table T4 shown in FIG. 5 and a control information push transmission process.

The content control apparatus CC1 continuously measures the present time and whenever the present time measured by this timekeeping process reaches any of the switch times of the records in the control schedule T3 ("Yes" in step SA1 of FIG. 5), the content control apparatus CC1 performs the update process described below.

In more detail, the content control apparatus CC1 updates the present state corresponding to the content ID of the appropriate record in the control table T4 to the post-switching state shown in the appropriate record in the control schedule T3 (step SA2). The content control apparatus CC1 also performs a process in accordance with the notification method of the appropriate record (steps SA3 to SA5). When the notification method is "push" (SA3: YES), the content control apparatus CC1 performs a control information generation process (described in detail later) in order to generate control information that includes a content ID, a present state and a key, and requests the gateway server GWS1 to multicast the generated control information in a push format. It should be noted that the gateway server GWS1 has a function for multicasting electronic mail to all of the mobile phones MS1 on the mobile packet communication network MPN in a push format.

In the processing shown in FIG. 5, when the communication format is "pull" (SA3: NO), nothing is done, and the processing returns to the timekeeping operation in step SA1.

Figure 6:
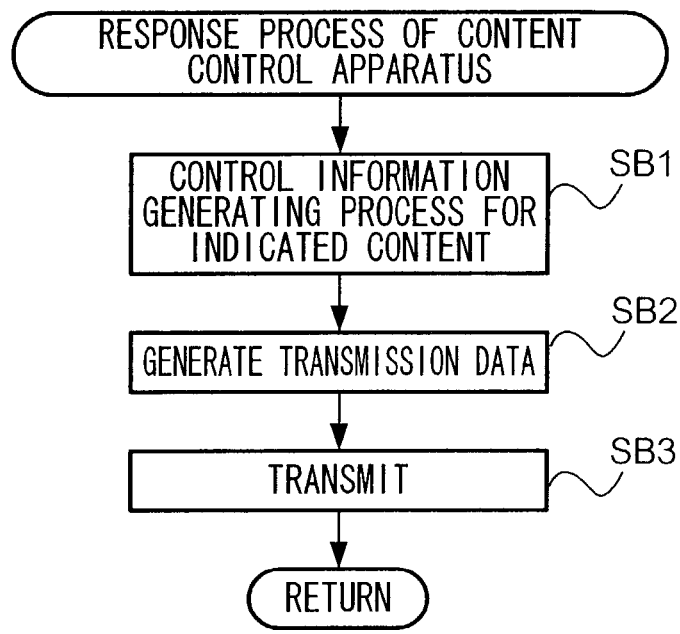
FIG. 6 is a flowchart showing a flow of a response process in the content control apparatus according to the first embodiment and a second embodiment of the invention.

For each of the contents stored in the control table T4, the content control apparatus CC1 performs the response process shown in FIG. 6 in response to a transmission request for control information received from a terminal apparatus (such as the video game console GM and the mobile phone MS1). This is to say, for at least one content that has been indicated in a request from a terminal apparatus, the content control apparatus CC1 refers to the control table T4 and performs a control information generating process (step SB1 in FIG. 6), generates transmission data in which one or more items of control information that have been generated are gathered together (step SB2), and sends the transmission data as a response to the terminal apparatus that sent the request (step SB3). It should be noted that the control information is not transmitted in its original form and transmission information is instead generated and transmitted since doing so reduces the communication overheads when a plurality of content IDs are indicated by a single request.

Figure 7:
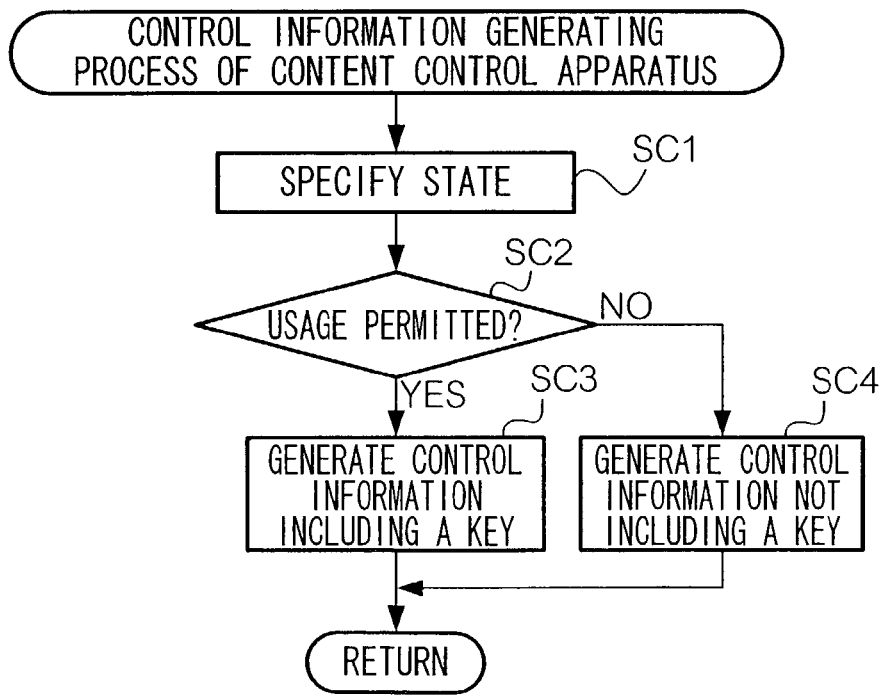
FIG. 7 is a flowchart showing a flow of a control information generating process according to the first embodiment.

The following describes the control information generating process performed by the content control apparatus CC1. In the control information generating process, the content control apparatus CC1 first refers to the control table T4 and specifies the present state corresponding to a content ID for which the present time has reached the switch time in the processing in FIG. 5 or a content ID that has been specified in the processing in FIG. 6 (step SCI in FIG. 7). When the present state is "usage permitted", the content control apparatus CC1 generates control information including the key (and also the content ID and present state), while when the present state is "usage prohibited", the content control apparatus CC1 generates control information that does not include a key (and includes only the content ID and present state) (steps SC2 to SC4).

Figures 8, 9:
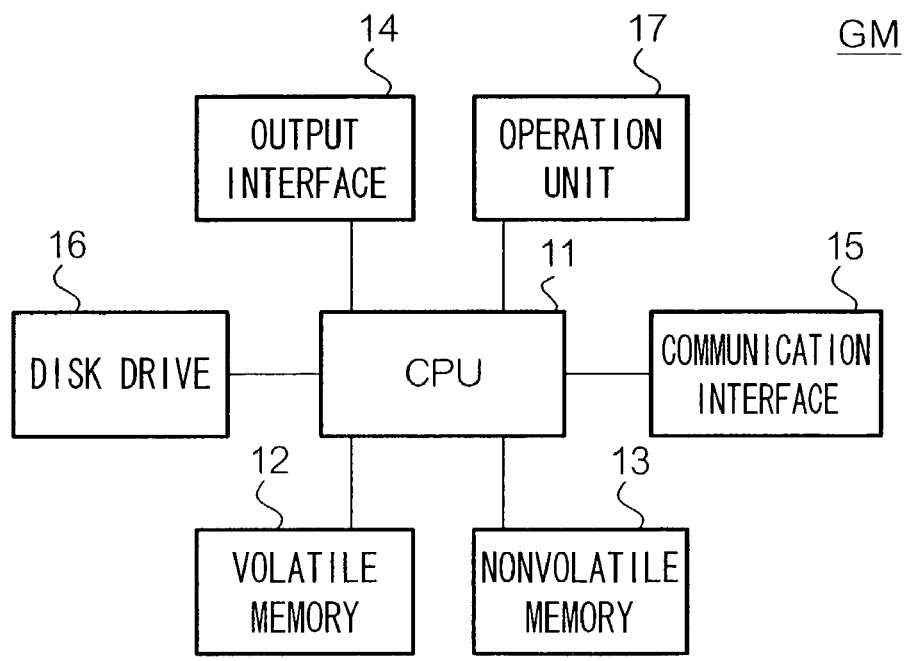
FIG. 8 is a conceptual diagram showing examples of the initial states of contents according to the first embodiment.
FIG. 9 is a block diagram showing the configuration of an essential part of a video game console that forms part of the content providing system 1 according to the first embodiment.

FIG. 8 is a conceptual diagram showing the initial state of each content recorded on the recording medium M that is delivered to users by the duplication/delivery center DDS. As described above, the initial state information is included in the leading content that is not encrypted (the contents with the content IDs 1_1 and 2_1). As shown in the drawing, the initial state information is provided for each content and is composed of a content ID, a key necessity, and a key. It should be noted that in FIG. 8, the symbol "−" is used in the key fields of the contents that do not need a key to show that a key is unnecessary. Though described in more detail later, the information in this drawing is read from the recording medium M into the video game console GM and is stored in the video game console GM in the same format as in the drawing.

FIG. 9 is a block diagram showing the configuration of the main part of the video game console GM. As shown in the drawing, the video game console GM includes a CPU (Central Processing Unit) 11 that performs various computational processes and control processes; a volatile memory 12 that is used by the CPU 11 as a work memory; a nonvolatile memory 13 that is used to store programs that are executed by the CPU 11, various kinds of data, etc.; an output interface 14 that outputs image and audio signals to the television receiver TV; a communication interface 15 for communicating with the mobile phone MS1; a disk drive 16 for reading data from a recording medium M that has been set; and an operation unit 17 for inputting user instructions. It should be noted that RAM (Random Access Memory) is appropriate for the volatile memory 12, while ROM (Read Only Memory), EEPROM (Electrically Erasable Programmable ROM), and the like are appropriate for the nonvolatile memory 13, though the memories 12 and 13 are not limited to these. However, as should be clear from the following explanation, the nonvolatile memory 13 should not be a memory that does not have a rewritable part.

When the video game console GM with the configuration described above is activated with a recording medium M having been set in the disk drive 16, the CPU 11 reads the leading content (in this case the content with the content ID 1_1) on the recording medium M and uses the read content. In more detail, the CPU 11 executes the communication program in the leading content and so becomes able to communicate with the content control apparatus CC1 via the mobile phone MS1 and executes the U/I program and so provides a user interface.

Figure 10:
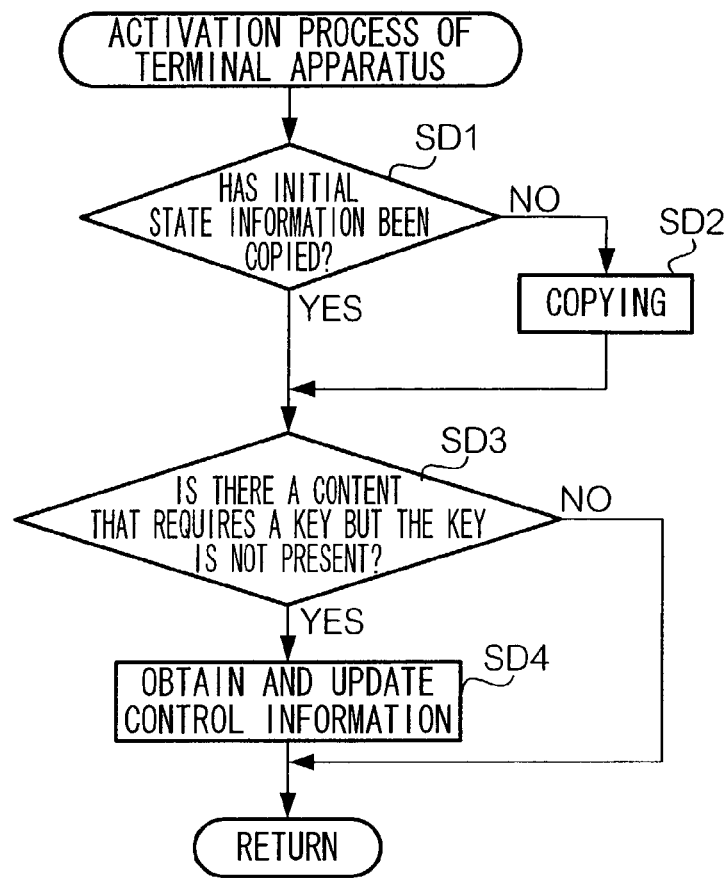
FIG. 10 is a flowchart showing a flow of an activation process of a terminal apparatus according to the first and second embodiments.
Figure 11:
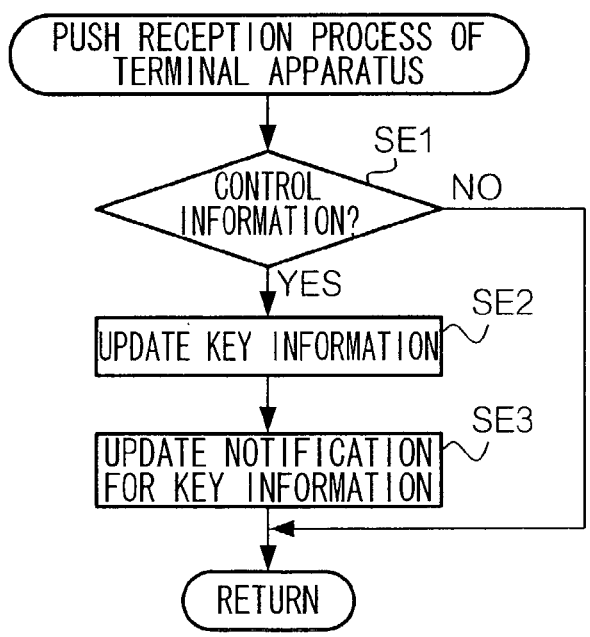
FIG. 11 is a flowchart showing a flow of a push reception process in a terminal apparatus according to the first and second embodiments.
Figure 12:
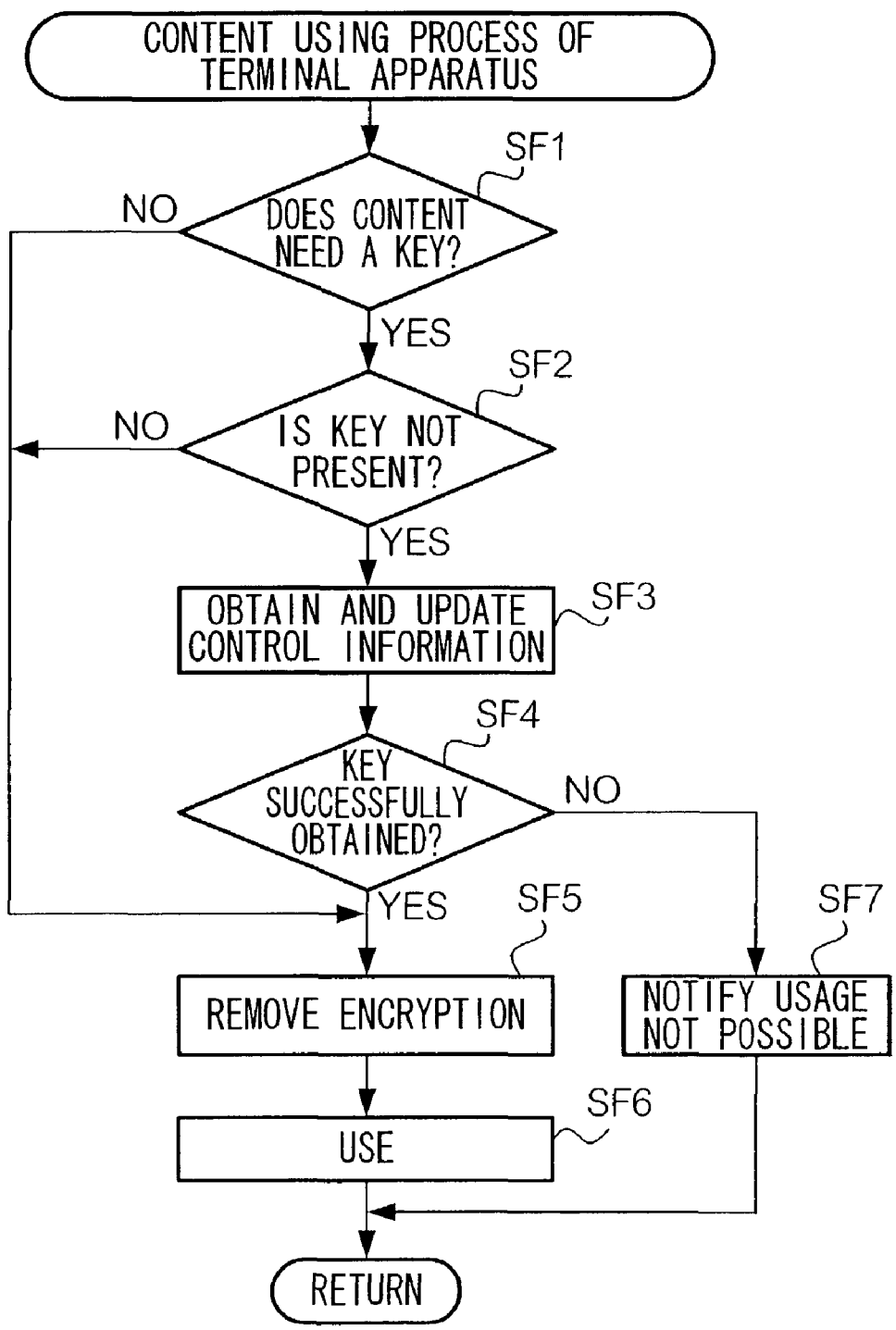
FIG. 12 is a flowchart showing a flow of a content utilizing process in a terminal apparatus according to the first and second embodiments.

The video game console GM also has a function for executing the activation process shown in FIG. 10, the push reception process shown in FIG. 11, and the content using process shown in FIG. 12.

First, on being activated with a recording medium M having been set in the disk drive 16, the video game console GM performs the activation process. This is to say, if the initial state information of the contents on the recording medium M have not been copied into a predetermined region of the nonvolatile memory 13, the CPU 11 reads the initial state information from the recording medium M and stores the initial state information in the nonvolatile memory 13 (steps SD1 to SD2 in FIG. 10).

Next, the CPU 11 searches, based on the initial state information written in the nonvolatile memory 13 (see FIG. 8, hereafter this information is referred to as "key information"), for a content that requires a key to be used, the key not having been stored in the nonvolatile memory 13. When such a content exists, the CPU 11 requests, via the communication interface 15, the content control apparatus CC1 to transmit control information corresponding to this content, and then updates the key information in the nonvolatile memory 13 based on the response to this request (steps SD3 to SD4). In other words, in the present embodiment, when activated, the video game console GM tries to update the state information that is stored internally to the latest information, so that there is no need for the user to perform an updating process.

Also, on receiving, via the communication interface 15, data that has been transmitted according to the push method, the video game console GM performs the push reception process. In other words, when the received information is control information, the CPU 11 updates the key information in the nonvolatile memory 13 based on the received control information, generates information for informing the user, via the television receiver TV, that the key information has been updated based on the control information, and supplies the generated information from the output interface 14 to the television receiver TV (step SE1 to SE3 in FIG. 11).

When an instruction for using a content has been inputted from the operation unit 17, the video game console GM performs the content using process. In other words, when the content indicated by the instruction is a content that requires a key and the key in question is stored in the nonvolatile memory 13, the CPU II uses the key in question to remove the encryption of the content, and performs a process in accordance with the inputted instruction (steps SF1, SF2, SF5, SF6 in FIG. 12).

When the content indicated by the instruction is a content that requires a key and the key in question is not stored in the nonvolatile memory 13, the CPU 11 requests the content control apparatus CC1 to transmit the control information corresponding to the content in question, updates the information in the nonvolatile memory 13 based on the response to this request, and, when the appropriate key has been successfully obtained (when the key has been written into the nonvolatile memory 13), uses the key to remove the encryption of the content in question, and performs a process in accordance with the inputted instruction (steps SF1 to SF6). It should be noted that when the key is not successfully obtained, the CPU 11 generates information for informing the user, via the television receiver TV, that the indicated content cannot be used, and supplies the generated information from the output interface 14 to the television receiver TV (step SF7).

With the configuration of the present embodiment, the mobile phone MS1 has a function for informing the video game console GM whenever electronic mail is received. On being informed in this way, the video game console GM performs the process in step SE1 shown in FIG. 11 in accordance with the content of the received mail. The content control apparatus CC1 is capable of providing a connection service to the Internet, with users using this service via the mobile phone MS1 so that the video game console GM requests and obtains the control information. This is possible since the communication program recorded on the recording medium M supports HTTP (HyperText Transfer Protocol) or a communication protocol that is compatible with HTTP and the U/I program supports a browser function that accesses pages written using HTML (HyperText Markup Language) or a descriptive language that is compatible with HTML. It should be noted that the electronic mail received by the mobile phone MS1 is transferred over the Internet INET using SMTP (Simple Mail Transfer Protocol), has been subjected to a protocol conversion by the gateway server GWS1, and is transferred using HTTP format on the mobile packet communication network MPN.

A-2. Example Operation

Next, the following describes one example of the operation of the present embodiment, with reference to the attached drawings. In the following example operation, the content C11 is assumed to be a mail order catalog and the content C12 is assumed to be a prize quiz. The recording medium M is assumed to have been distributed already.

First, the user sets the recording medium M in the disk drive 16 of the video game console GM and activates the video game console GM, so that the initial state information (see FIG. 8) recorded on the recording medium M is stored in the nonvolatile memory 13 of the video game console GM (steps SD1 to SD4 in FIG. 10), and selection options for the content C11 and content C12 are presented on the television receiver TV. When the user operates the video game console GM and selects the content C11 at this point, the screen a, which is shown as an example display in FIG. 13, is displayed on the television receiver TV. It should be noted that hyperlinks are set for the legends "September 2000 Edition", "October 2000 Edition", "November 2000 Edition", and "December 2000 Edition", with these legends being respectively linked to the contents with the content IDs, 1_1, 1_2, 1_3, and 1_4.

It is assumed that the user operates the operation unit 17 of the video game console GM and selects the legend "October 2000 Edition". In the present embodiment, the content ID of the content to which this selection option is linked is 1_2, for example, and the key that is required to use the content in question is present in the nonvolatile memory 13, as shown in FIG. 8, so that the video game console GM can read the content with the content ID 1_2 from the recording medium M and decrypt the content using this key. As a result, it becomes possible for the user to use the content (steps SF1, SF2, SF5, and SF6 in FIG. 12). In other words, a screen like the screen b shown in FIG. 13 is displayed on the television receiver TV, so that the user can hereafter use the mail order catalog entitled "October 2000 Edition".

When the user selects the "Order" button in the screen b, the video game console GM transmits information corresponding to this button via the mobile phone MS1 to the content providing apparatus CP11 by way of the mobile packet communication network MPN, the gateway server GWS1, and the Internet INET. The processing hereafter is the same as in conventional online shopping and so is not explained. It should be noted that the information that is transmitted to the content providing apparatus CP11 and the address are set in advance in the content with the content ID 1_2 and in the U/I program.

In screen a, assume that the user selects the "November 2000 Edition" on Oct. 15, 2000. In the present embodiment, the content ID of the content that is linked to this selection option is 1_3, for example, and the key that is required to use this content is not present in the nonvolatile memory 13, as shown in FIG. 8. In this case, the video game console GM needs to request the content control apparatus CC1 to transmit the control information, so that the video game console GM requests the transmission of the control information corresponding to the content in question via the mobile phone MS1 and by way of the mobile packet communication network MPN, the gateway server GWS1, and the Internet INET (steps SF1 to SF3 in FIG. 12).

On Oct. 15, 2000, the present state for the content with the content ID 1_3 in control table T4 is "usage prohibited", as shown in FIG. 4, so that the content control apparatus CC1 generates control information that does not include the key (steps SC1, SC2, and SC4 in FIG. 7) and sends this control information as a response to the request (steps SB1 to SB3 in FIG. 6). Since the control information does not include the key, the video game console GM that receives this response has an indication, which shows that the content with the content ID 1_3 cannot be used, displayed on the television receiver TV to inform the user (steps SF3, SF4, and SF7).

Time passes, so that when the present time reaches 11:00 on Nov. 1, 2000, in the content control apparatus CC1, the present state of the content with the content ID 1_3 in the control table T4 becomes "usage permitted", based on the control schedule T3 in FIG. 4, and the corresponding record is deleted from the control schedule T3 (steps SA1 to SA3 in FIG. 5). In this state, if the user selects the "November 2000 Edition", the video game console GM requests the content control apparatus CC1 to transmit control information corresponding to the content with the content ID 1_3, in the same way as described above.

Since the present state of the content with the content ID 1_3 in the control table T4 is "usage permitted" at this time, in the content control apparatus CC1 control information that includes a key is generated (steps SC1 to SC3 in FIG. 7) and is transmitted to the video game console GM as a response to the above request. Since the key is included in the control information, the video game console GM that receives this response via the mobile phone MS uses the key to decrypt the content with the content ID 1_3, and uses the content to provide a user interface (steps SF3 to SF7 in FIG. 12).

At this time, if the content C12 is selected out of the selection options for the content C11 and the content C12, the screen c shown in FIG. 14 is displayed on the television receiver TV. This screen c is a screen that is based on the content with the content ID 2_1 (a content whose usage is permitted from the outset), so that the user who sees this screen can know that the start of the prize quiz is 0:00 on Jan. 1, 2001.

As more time passes and the present time reaches 0:00 on Jan. 1, 2001, in the content control apparatus CC1 the present state of the content with the content ID 2_2 in control table T4 becomes "usage permitted", based on the control table T4 shown in FIG. 4. As a result, the user becomes able to use the content with the content ID 2_2 hereafter, and when the user uses this content, the screen d, for example, is displayed on the television receiver TV.

The amount of data for the image that is used by the quiz shown in screen d is much larger than the amount of data for the text, but this image is recorded in advance on the recording medium M, so that the communication on the mobile packet communication network MPN and the Internet INET is not impeded. When the user selects the "Enter quiz" button in screen d, the video game console GM transmits the information that has been inputted into the answer fields via the mobile phone MS1 to the content control apparatus CC1, by way of the mobile packet communication network MPN, the gateway server GWS1, and the Internet INET. The processing hereafter is the same as in an ordinary online prize draw.

Once more time passes and the present time reaches 17:00 on Jan. 7, 2001, in the content control apparatus CC1 the present state of the content with the content ID 2_2 in control table T4 becomes "usage prohibited" and control information (that does not include a key) is generated based on the present state after updating. The electronic mail that includes this control information is multicast from the gateway server GWS1 to all of the mobile phones served by the mobile packet communication network, while the gateway operates in accordance with a request from the content control apparatus CC1 (steps SA1 to SA5 in FIG. 5).

When the mobile phone MS1 receives the electronic mail including the above control information, the video game console GM updates the key information in FIG. 8 based on the control information in question and notifies the user of the updating (steps SE1 to SE3 in FIG. 11). At this point the key in question is deleted from the video game console GM. As a result, the content with the content ID 2_2 cannot be used hereafter. This means that users cannot enter the prize quiz hereafter.

It should be noted that in the present embodiment, contents are provided having been recorded on a portable recording medium M, so that there is the advantage for content providers that contents can be provided both at a low cost and quickly, while there are the advantages for users that contents can be obtained in a timely fashion and that the contents are portable.

B. Second Embodiment

B-1. Configuration

Figure 15:
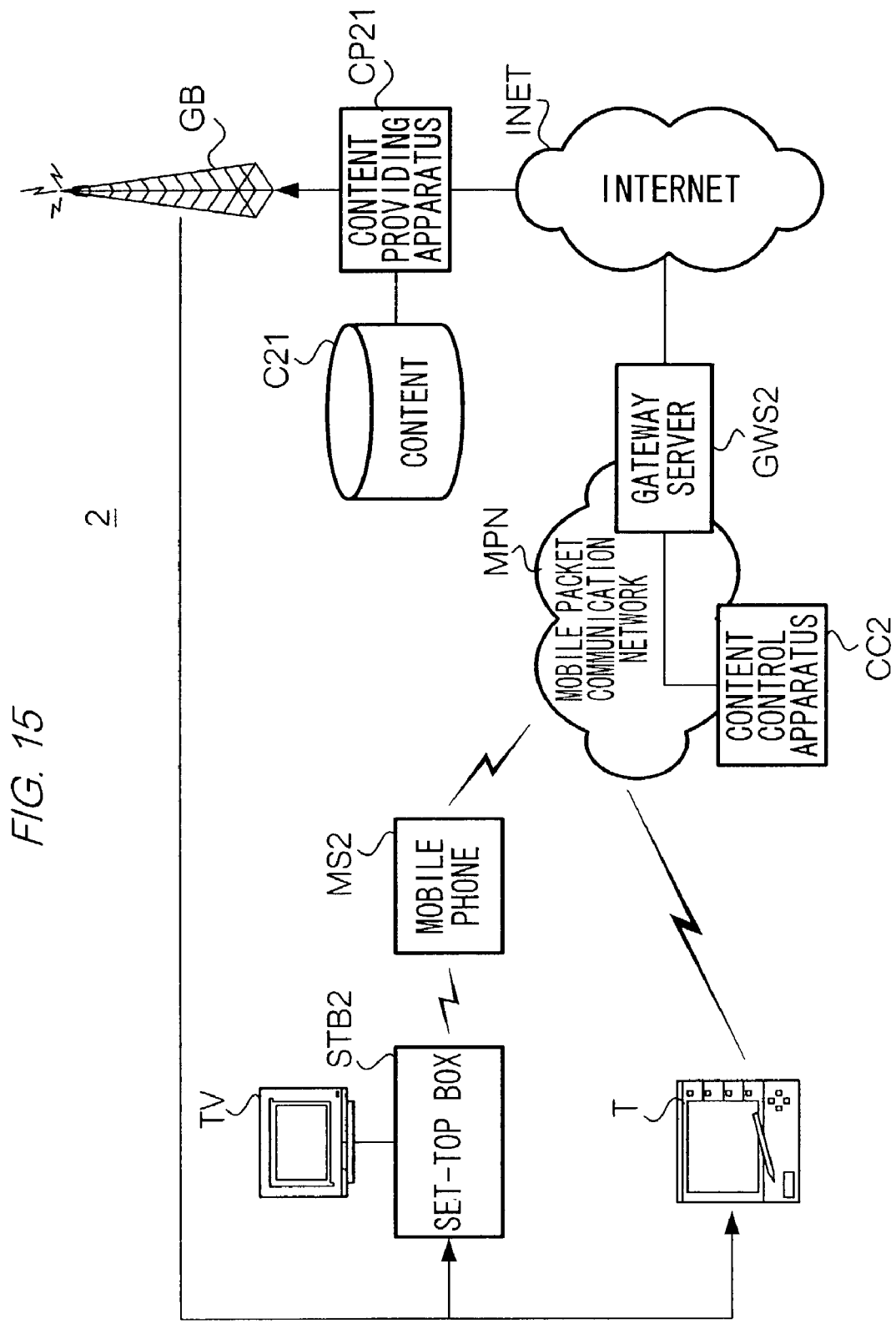
FIG. 15 shows an overall configuration of a content providing system 2 according to the second embodiment.

FIG. 15 shows the overall configuration of a content providing system 2 according to a second embodiment of the present invention. As one example, the content providing system 2 shown in the drawing may comprise a content providing apparatus CP21, a content C21, a content control apparatus CC2 that is connected to a gateway server GWS2 by a mobile packet communication network MPN, and a mobile information terminal T served by the mobile packet communication network MPN. In addition, the system 2 includes a set-top box STB2, which has a wireless local communication function and is used in place of the video game console GM of the first embodiment, and a mobile phone MS2, which is served by the mobile packet communication network MPN and is equipped with a wireless local communication function for communicating with the set-top box STB2. The set-top box STB2 is connected to the television receiver TV so that the user can refer to information on the screen. In the present embodiment, contents are not passed over from a duplication/delivery center DDS to a video game console GM using a recording medium M like in the first embodiment; rather a configuration where a terrestrial wave broadcast station GB that is capable of digital broadcasts provides contents to the set-top box STB2 and the mobile information terminal T is used.

The following describes the various components of the present embodiment, with the assumption that the content C21 has the configuration shown in FIG. 16. In order to simplify the explanation, only the parts that differ from the first embodiment are described.

First, the content providing apparatus CP21 delivers one or more contents to the terrestrial wave broadcast station GB. The content providing apparatus CP21 also passes over a control request table T5, such as that shown in FIG. 17, to the content control apparatus CC2.

As shown in FIG. 17, each record in the control request table T5 includes, for example, a content ID, a switch time at which the corresponding content switches between usage permitted and usage prohibited, a post-switching state that corresponds to the content ID and the switch time, a corresponding content key, a notification method, and an age showing an age restriction for users of the corresponding content.

On receiving the control request table T5, the content control apparatus CC2 generates, a control schedule T6 and a control table T7, an example of which is shown in FIG. 18, based on the control request table T5, and controls the usage of the distributed contents, based on the control schedule T6, the control table T7 and attribute information for the user that is obtained from the gateway server GWS. It should be noted that the control table T7 has an age field in addition to the content of the control table T4 of the first embodiment.

Figure 19:
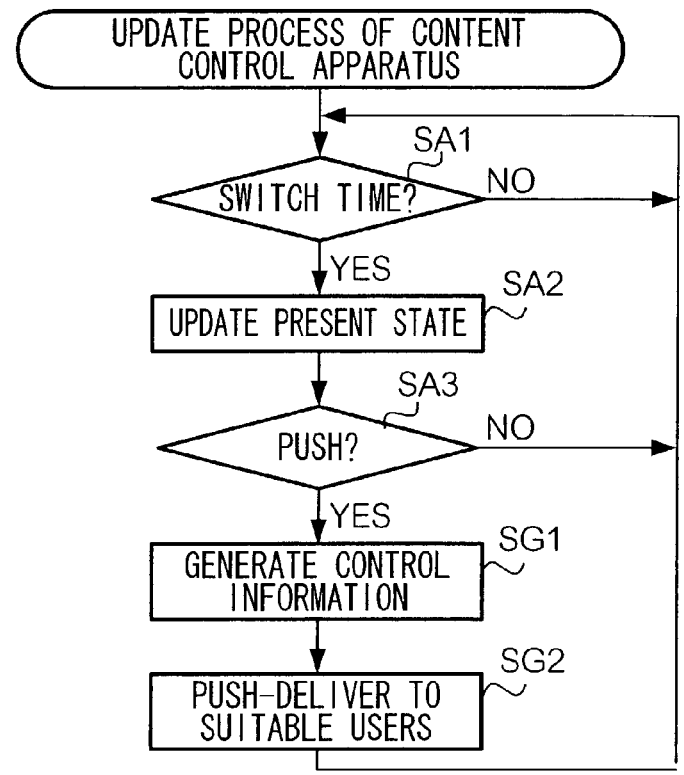
FIG. 19 is a flowchart showing a flow of an update process of the content control apparatus according to the second embodiment.
Figure 20:
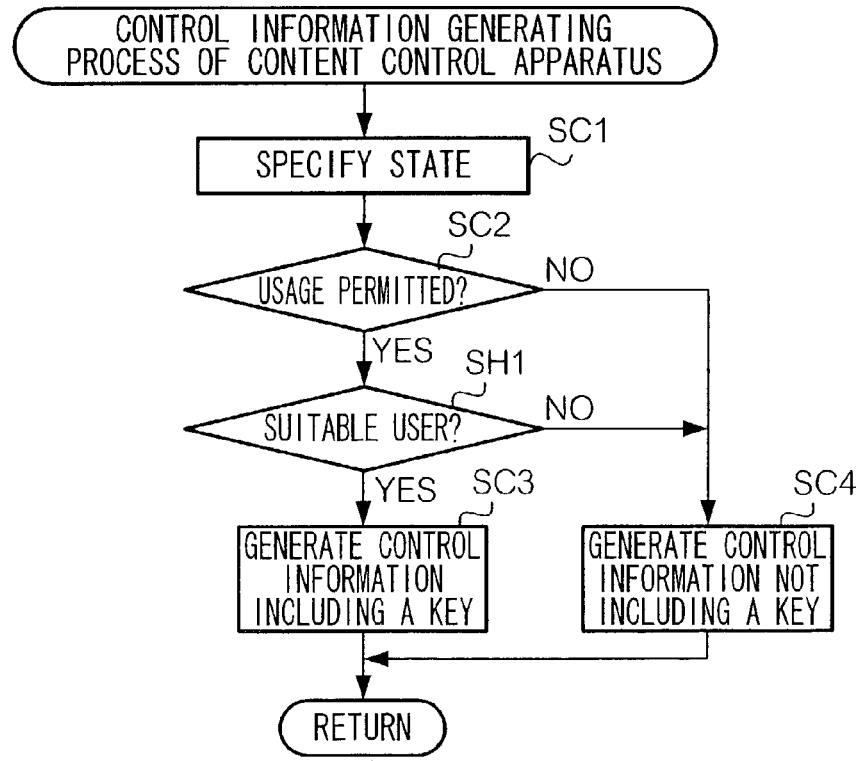
FIG. 20 is a flowchart showing a flow of a control information generating process according to the second embodiment.

When, during the update process shown in FIG. 19, a record that is to be push-delivered due to the present time having reached the switch time is present in the control schedule T6, the content control apparatus CC2 generates control information (step SG1), and requests the gateway server GWS2 to multicast the generated control information in the "push" manner (step SG2). Also, during the control information generating process shown in FIG. 20, the content control apparatus CC2 judges, when the present state is "usage permitted", whether the user that has requested the control information satisfies the age restriction (step SH1) and generates control information including the key if this is the case, or generates control information that does not include the key if this is not the case.

It should be noted that the gateway server GWS2 has a function for multicasting electronic mail in a conditional push manner to mobile phones MS2 on the mobile packet communication network MPN, based on attribute information (such as sex, date of birth, address, and present location) of subscribers. In other words, the gateway server GWS2 has a function for transmitting electronic mail to subscribers that satisfy certain conditions. The gateway server GWS2 also has a subscriber information table T8 (see FIG. 18) that stores attribute information on the subscribers of the mobile packet communication network MPN, and has a function for receiving inquiries from the content control apparatus CC2 and transmitting attribute information for subscribers as a response.

The gateway server GWS2 additionally has a function for charging, based on settings made in advance, a specified node a communication fee (a usage fee for the mobile packet communication network MPN) incurred when a terminal apparatus accesses the node. In the present embodiment, the communication fee that is incurred when a terminal apparatus sends a request to the content control apparatus CC2 is billed to the content control apparatus CC2 so as to promote the usage of contents, though the invention is not limited thereto. The communication cost may be finally borne by the content provider that provides the content C21. In any case, in the present embodiment it is assumed that the company that manages the content control apparatus CC2 and the content provider enter a suitable contract regarding communication fees.

Figures 21, 22:
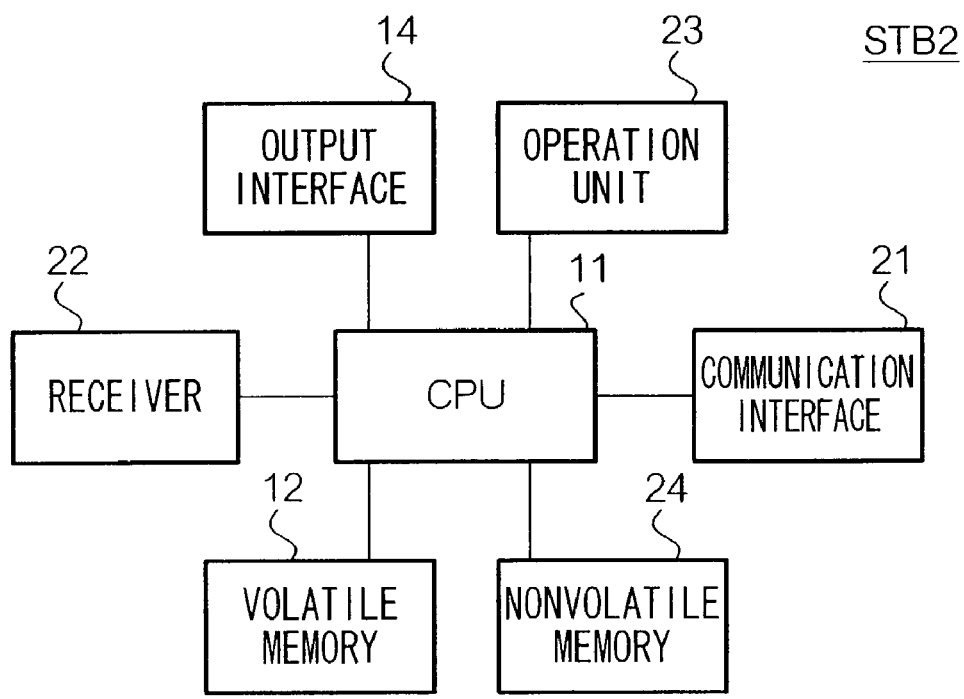
FIG. 21 is a conceptual diagram showing one example of the initial states of contents according to the second embodiment.
FIG. 22 is a block diagram showing the configuration of an essential part of a set-top box that forms part of the content providing system 2 according to the second embodiment.

FIG. 21 is a conceptual diagram showing the initial states of the contents broadcast by the terrestrial wave broadcast station GB, with this information being stored in the set-top box STB2 and the mobile information terminal T in the format shown in the drawing.

FIG. 22 is a block diagram showing the configuration of the essential parts of the set-top box STB2. In FIG. 22, the communication interface 21 is an interface for performing wireless local communication with the mobile phone MS2, so that information can be exchanged between the set-top box STB2 and the content control apparatus CC2 by having the CPU 11 that executes a communication protocol and a U/I program included in a content communicate with the mobile phone MS2 via the communication interface 21. A receiver 22 receives digital broadcasts from the terrestrial wave broadcast station GB, while an operation unit 23 includes a remote controller or the like. A nonvolatile memory 24 is composed, for example, of a ROM for storing a control program and the like and a hard disk drive for storing contents and the like. The other parts of the configuration are the same as in the video game console GM of the first embodiment, and so have been given the same reference numerals as before.

Figure 23:
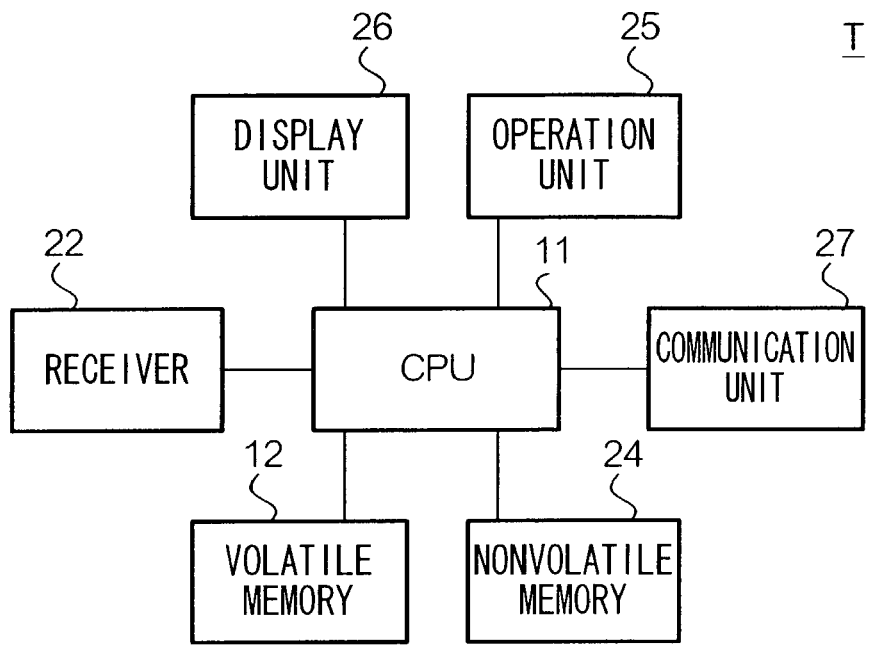
FIG. 23 is a block diagram showing the configuration of an essential part of a mobile information terminal that forms part of the content providing system 2 according to the second embodiment.

FIG. 23 is a block diagram showing the configuration of the essential parts of the mobile information terminal T. In FIG.

23, an operation unit 25 is a pen-type input device, while a display unit 26 is an LCD (liquid crystal display) panel or the like that is integrally provided with the main body of the mobile information terminal T. With regard to packet communication, a communication unit 27 has a function that is a combination of the functions of the mobile phone MS1 and the communication interface 15 of the video game console GM of the first embodiment. By having operation means, reception means, display means, and communication means provided in a single portable device, the mobile information terminal T has an advantage in that contents can be obtained and used anywhere and at any time.

Note that as should be clear from the above explanation, the combination of the set-top box STB2, the television receiver TV and mobile phone MS2 has similar functions to the mobile information terminal T. Consequently, the following explanation fundamentally makes no distinctions between these. In such cases, both sets of equipment are indicated using the general name "terminal apparatus".

Figure 24:
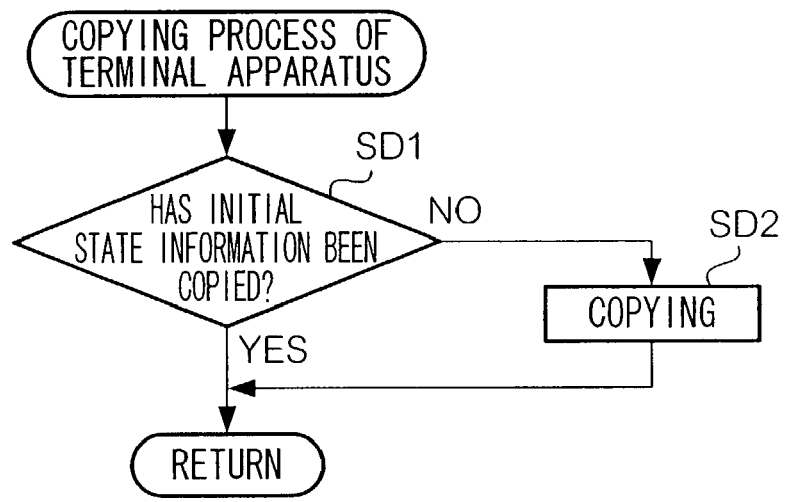
FIG. 24 is a flowchart showing a flow of an activation process of a terminal apparatus that forms part of the content providing system 2 according to the second embodiment.

When the user instructs a terminal apparatus with the configuration described above to use a content, the CPU 11 reads the content in question (in this case, the content with the content ID 1_1), and uses the content. After being activated, a terminal apparatus usually receives a content, so that in place of the activation process of the first embodiment in FIG. 10, the copying process shown in FIG. 24 is executed. In other words, the terminal apparatus does nothing on being activated, but when a content is received, the terminal apparatus copies the initial state information as necessary into the nonvolatile memory 24.

B-2. Example Operation

The following describes an example operation of the present embodiment with reference to the drawings. In this example, the content C21 is assumed to be a DVD mail order catalog. The content C21 is also assumed to have been already broadcast from the terrestrial wave broadcast station GB. It should be noted that in the following explanation, parts that are the same as the example operation of the first embodiment (which includes, for example, parts with minor differences such as wired communication having been replaced with wireless communication) are not described.

First, if the user instructs a terminal apparatus to use the contents with the content IDs 1_1 and 1_2 when the present date as Oct. 15, 2000, the terminal apparatus performs the content using process shown in FIG. 12 for each of these contents (steps SF1 and SF2). As shown in FIG. 21, the key that is required to use the content with the content ID 1_2 is not present in the nonvolatile memory 13, so that for the content in question, the terminal apparatus requests, via the mobile packet communication network MPN and the gateway server GWS2, the content control apparatus CC2 to transmit control information (step SF3 in FIG. 12). The communication fee for this request is billed to the content control apparatus CC2.

As shown in FIG. 17, on Oct. 15, 2000, the present state of the content with the content ID 1_2 in the control schedule T6 is "usage prohibited", so that in the content control apparatus CC2 control information that does not include a key (steps SC1, SC2, and SC4 in FIG. 20) is generated and transmitted as a response to the request (steps SB1 to SB3 in FIG. 6). Since the above control information does not include a key, the communication apparatus has an image showing that the content with the content ID 1_2 cannot be used displayed on the television receiver TV to notify the user (steps SF3, SF4, and SF7 in FIG. 12).

However, as shown in FIG. 21, since the content with the content ID 1_1 does not require a key to be used, the screen that is displayed to the user becomes the screen e shown in FIG. 25. In the screen e, an image corresponding to the content with the content ID 1_1 is displayed on the left side and an image corresponding to the content with the content ID 1_2 is displayed on the right side, with the latter being an image that is not sufficient for the user to purchase a DVD. In other words, in this state the user can view a summary of a DVD corresponding to the content with the content ID 1_2, but is not able to purchase the DVD in question. It should be noted that the operation performed when the "Order" button in the screen e is selected is the same as when the "Order" button is selected in the screen b in FIG. 13.

As time passes and the present time reaches 0:00 on Nov. 1, 2000, in the content control apparatus CC2 the present state of the contents with the content IDs 1_2 and 1_3 in the control table T7 become "usage permitted", based on the control schedule T6 shown in FIG. 18, with the appropriate records being deleted from the control schedule T6 (steps SA1 to SA3 in FIG. 19). If the user then instructs the usage of the contents with the content IDs 1_1 and 1_2 in this state, as described above, the terminal apparatus requests the content control apparatus CC2 to transmit control information corresponding to the content with the content ID 1_2. The communication fee related to this request is billed to the content control apparatus CC2.

At this point, the present state of the content with the content ID 1_2 in the control table T7 is "usage permitted", so that the content control apparatus CC2 sends an inquiry to the gateway server GWS2 about the date of birth of the user. The gateway server GWS2 refers to the subscriber information table T8 stored in a memory and notifies the content control apparatus CC2 of the date of birth of the user in question, with the content control apparatus CC2 judging, based on the result of the inquiry and the present time, whether the user's age is suitable for the content in question. When, as a result of this judgment, the user's age is not suitable, the content control apparatus CC2 generates and transmits control information that does not include the key. In this case, the screen e is obtained as described above. On the other hand, when the user's age is suitable, the content control apparatus CC2 generates control information that includes the key (steps SC1, SC2, SH1, and SC3 in FIG. 20), and transmits the control information to the terminal apparatus. In this case, a screen f, such as that shown in FIG. 25, is displayed to the user (steps SF3 to SF6 in FIG. 12).

It should be noted that the operation for the push delivery can be easily worked out from the preceding explanation and the push delivery operation described in the first embodiment. The push delivery operation in the present embodiment differs from the push delivery operation in the first embodiment only in that the content control apparatus CC2 specifies a condition (such as a date of birth that is Nov. 1, 1982 or later) when requesting the gateway server GWS2 to transmit the control information and in that the gateway server GWS2 transmits electronic mail including the control information to members that satisfy the condition.

By operating in this way, the generation of redundant traffic is avoided with present embodiment. Also, with the present embodiment, contents can be provided at higher speed with more precise control being performed over contents regardless of whether push or pull communication is performed. As one example, control that has information relating to a prize draw presented only during a period of several days to users that satisfy specific conditions can be performed.

C. Modification

It should be noted that in the first embodiment, the U/I program and the communication program are provided for each recording medium M, though such duplication of programs may be rectified. It should be obvious that in each of the above embodiments, the U/I program and the communication program may be stored in advance in each terminal apparatus so that these programs can be excluded from the contents. Also, while the above embodiments are described by means of an example where the contents are decrypted using keys, the keys may be decryption keys, or may be information that is unconnected to the encryption algorithm. It is also possible for contents to be transmitted using broadband communication, with only the control over the usage of contents being performed using narrowband communication.

Figure 26:
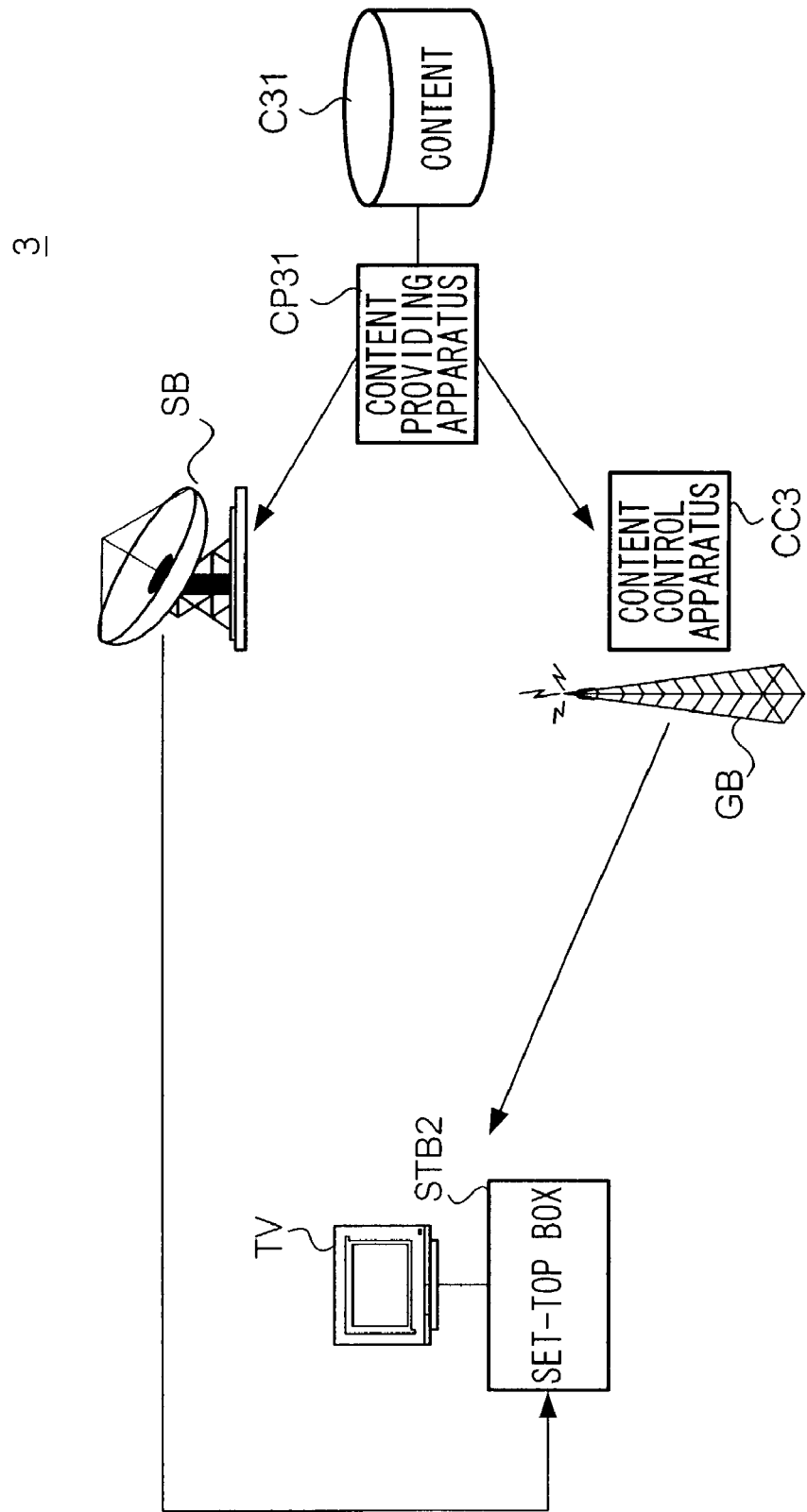
FIG. 26 shows an overall configuration of a content providing system 3 according to a modification of the first and second embodiments.

As shown by the modification in FIG. 26, a content may be provided by a broadcast, with the control over the usage of contents being performed using a different broadcast. In the content providing system 3 shown in FIG. 26, a content providing apparatus CP31, which has the same functions as the content providing apparatus CP11, broadcasts the content C31 included in the content providing apparatus CP31 from a satellite broadcast station SB, and the control information for using the broadcast content is broadcast by a content control apparatus CC3 from a terrestrial wave broadcast station GB. It should be noted that the set-top box STB3 differs from the set-top box STB2 only in that the set-top box STB3 is equipped with a receiver for satellite broadcasts in place of the communication interface 21 (see FIG. 22), and in that control information is received by the receiver 22 for terrestrial wave broadcasts together with the reception of the content by the receiver for satellite broadcasts.

Figures 27, 28, 29:
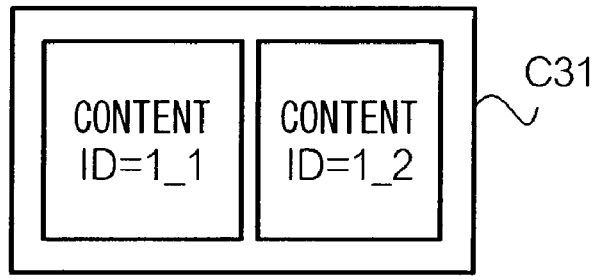
FIG. 27 is a conceptual diagram showing one example of the configuration of contents that are provided by the content providing system 3 according to the modification.
FIG. 28 is a conceptual diagram showing one example of the data configuration of a control request table T9 that is provided to a content control apparatus from a content providing apparatus with respect to the control of contents according to the modification.
FIG. 29 is a conceptual diagram showing examples of the initial states of contents in the modification.

The following describes the operation of the content providing system 3 for the case where the content C31 has the configuration shown in FIG. 27. In this case, the configuration of the control request table T9 that the content providing apparatus CP31 sends to the content control apparatus CC31 is as shown in FIG. 28, for example. The control request table T9 differs from the control request table in the first embodiment in that there is no notification method field. This difference is caused by the transfer medium for the control information being a one-way broadcast instead of two-way communication.

When the content C31 is broadcast from the satellite broadcast station SB, initial state information, like that shown in FIG. 29, is written into the nonvolatile memory 12 of the set-top box STB3 that received the broadcast. After this, time passes and when the present time reaches 0:00 on Nov. 1, 2000, control information including the key is broadcast from the terrestrial wave broadcast station GB, with the set-top box STB3 that receives the control information storing the key in question with the key being associated with the content with the content ID 1_2.

Figure 30:
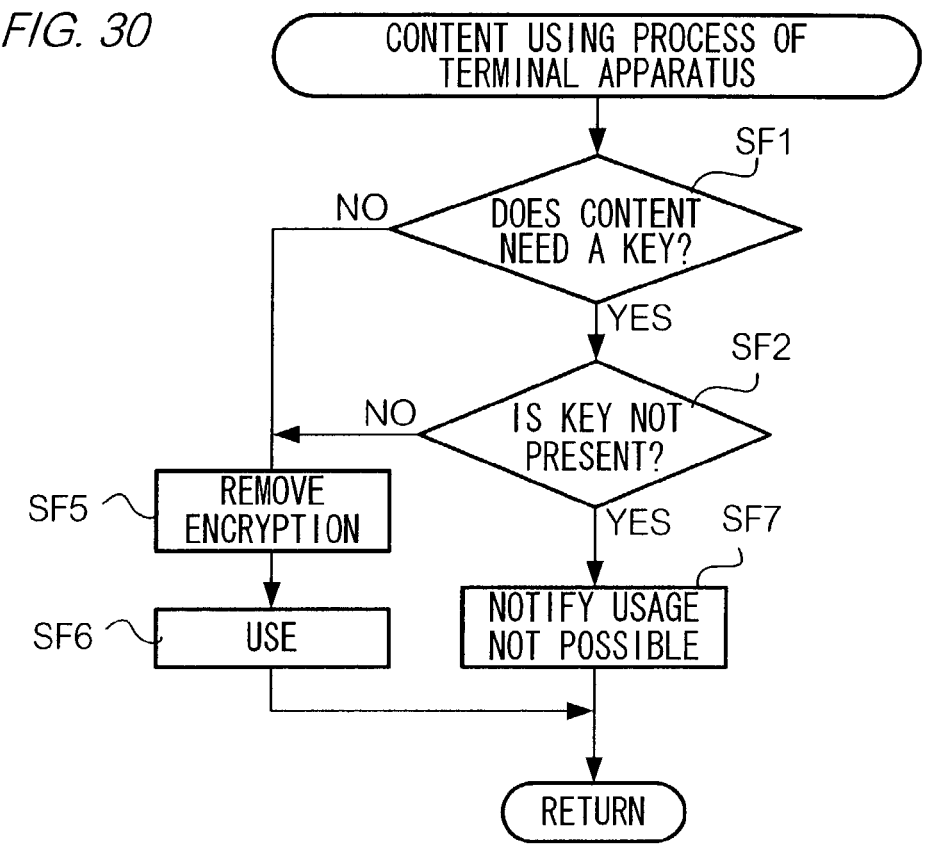
FIG. 30 is a flowchart showing a flow of a content utilizing process in a terminal apparatus according to the modification.

When the content is used, the content using process shown in FIG. 30 is performed in the set-top box STB3. This process differs from the process shown in FIG. 12 only in that there is no processing relating to the obtaining of control information. In other words, when a key is required to use a content and the key in question is not present in the set-top box STB3, the set-top box STB3 informs the user that the content cannot be used, but in other cases, the set-top box STB3 removes the encryption of the content and uses the content.

Figure 31:
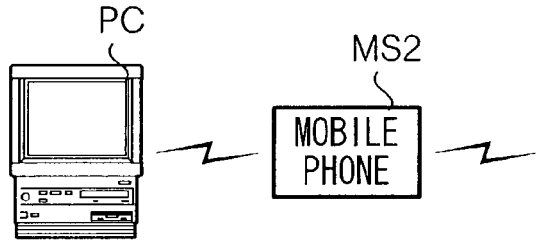
FIG. 31 shows another example configuration of user equipment.
Figure 32:
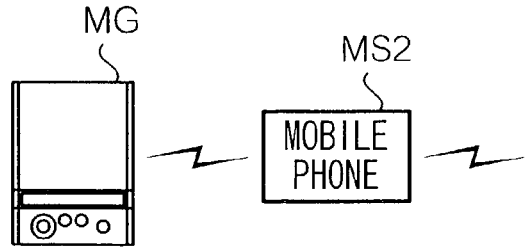
FIG. 32 shows another example configuration of user equipment.

It should be noted that any configuration may be used for the content providing facility and the user equipment, so that such facility and equipment are not restricted to the configurations described above. As one example, the content providing facility described above has the content providing apparatus and content control apparatus provided as separate apparatuses to increase the freedom with which systems can be configured, though both apparatuses may be combined in a single apparatus. It should be obvious that a plurality of content control apparatuses may be used. The user equipment for contents may be composed of a terminal apparatus in which a home computer terminal PC and a mobile phone MS2 can communicate with each other (see FIG. 31), or a terminal apparatus in which a portable game console MG and a mobile phone MS2 can communicate with each other (see FIG. 32).

It should be obvious that the present invention is not limited to the particulars of the description given above, and that the invention may be realized in any form within the scope of the invention.

The invention claimed is:

1. A method for accessing content stored on a tangible storage media comprising:
   receiving the tangible storage media with a media access device;
   determining, with the media access device, that the media access device does not include content control information used to access the content stored on the tangible storage media;
   the media access device sending a request to a content control apparatus for the content control information, the request sent via a mobile communication terminal connected to a mobile communication network;
   the content control apparatus receiving the request for content control information and requesting subscriber information associated with the mobile communication terminal from a gateway server in communication with the mobile communication network;
   the gateway server receiving the request for subscriber information and sending at least a portion of the subscriber information associated with the mobile communication terminal to the content control apparatus; and
   the content control apparatus sending control information associated with the content stored on the tangible storage media via the mobile communication terminal to the media access device based upon the request for the content control information and the subscriber information associated with the mobile communication terminal.

2. The method of claim 1, further comprising determining, with the media access device, that the content control information does not includes a content key used to permit access to the content stored on the tangible storage media after determining that the media access device does contain the content control information; and
   sending, with the media access device, a request to obtain the content key from the content control apparatus via the mobile communication terminal.

3. The method of claim 2, further comprising:
   receiving, with the media access device, the content key from the content control apparatus through the mobile communication terminal.

4. The method of claim 1, further comprising:
   receiving, with the media access device, an update of the content control information from the content control apparatus through the mobile communication terminal.

5. The method of claim 4, further comprising:
   the media access device prohibiting access to the content stored on the tangible storage media after receiving an indication in the updated content control information that usage of the content stored on the tangible storage media is prohibited.

6. The method of claim 1, wherein the subscriber information includes an age parameter of a user associated with the mobile communication terminal, the age parameter indicating an age of the user, the method further comprising:

determining, with the content control apparatus, whether the content stored on the tangible storage media is age appropriate based upon the age parameter of the user associated with the mobile communication terminal.

7. The method of claim 6, further comprising:
the content control apparatus refusing to send content control information necessary to access the content of the tangible storage media to the media access device after determining that the content of the tangible storage media is inappropriate for the age of the user associated with the mobile communication terminal.

8. The method of claim 1, further comprising charging the content control apparatus with an expense, the expense associated with transmission of the content control information through the communication network.

* * * * *